United States Patent
Wu et al.

(10) Patent No.: US 10,794,731 B2
(45) Date of Patent: Oct. 6, 2020

(54) SYSTEM AND METHOD FOR DETECTING POSITION OF DEVICE AND POSITION DETECTION MODULE

(71) Applicant: GENERAL ELECTRIC COMPANY, Schenectady, NY (US)

(72) Inventors: Xiaojie Wu, Shanghai (CN); Liu Wei, Shanghai (CN); Jiang Yemin, Shanghai (CN)

(73) Assignee: Baker Hughes, a GE Company, LLC, Houston, TX (US)

( * ) Notice: Subject to any disclaimer, the term of this patent is extended or adjusted under 35 U.S.C. 154(b) by 80 days.

(21) Appl. No.: 15/300,302

(22) PCT Filed: Mar. 23, 2015

(86) PCT No.: PCT/US2015/021927
§ 371 (c)(1),
(2) Date: Sep. 29, 2016

(87) PCT Pub. No.: WO2015/153158
PCT Pub. Date: Oct. 8, 2015

(65) Prior Publication Data
US 2017/0153126 A1 Jun. 1, 2017

(30) Foreign Application Priority Data
Mar. 31, 2014 (CN) .......................... 2014 1 0127094

(51) Int. Cl.
*F01D 17/14* (2006.01)
*G01D 5/22* (2006.01)
(Continued)

(52) U.S. Cl.
CPC ......... *G01D 5/2291* (2013.01); *F01D 17/145* (2013.01); *F01D 21/003* (2013.01);
(Continued)

(58) Field of Classification Search
CPC .. G01D 5/2291; G01D 5/2046; F01D 17/145; F01D 21/003
(Continued)

(56) References Cited

U.S. PATENT DOCUMENTS 4,277,832 A * 7/1981 Wong .................. G05D 7/0635
137/487
4,364,045 A 12/1982 Spiegel
(Continued)

FOREIGN PATENT DOCUMENTS

EP 1058390 A2 6/2000
EP 2177879 A2 4/2010

OTHER PUBLICATIONS

International Search Report issued in connection with corresponding PCT Application No. PCT/US2015/021927 dated May 27, 2015.

*Primary Examiner* — Eman A Alkafawi
(74) *Attorney, Agent, or Firm* — Mintz Levin Cohn Ferris Glovsky and Popeo, P.C.

(57) ABSTRACT

A method for measuring a position of a device which is connected to a position sensor is provided. The method includes the steps of controlling an excitation unit to generate an excitation signal which excites the position sensor to provide a first feedback signal proportioned to the displacement of the device, controlling a sampling unit to sample the first feedback signal and obtain a plurality of first feedback samples, and calculating the position of the device based at least in part on the first feedback samples.

14 Claims, 5 Drawing Sheets

(51) Int. Cl.
*G01D 5/20* (2006.01)
*F01D 21/00* (2006.01)

(52) U.S. Cl.
CPC ......... *G01D 5/2046* (2013.01); *G01D 5/2258* (2013.01); *F05D 2220/31* (2013.01); *F05D 2220/32* (2013.01)

(58) Field of Classification Search
USPC .................................................. 702/150, 138
See application file for complete search history.

(56) References Cited

U.S. PATENT DOCUMENTS

| | | | |
|---|---|---|---|
| 6,453,261 B2 * | 9/2002 | Boger | ..................... F15B 5/006 |
| | | | 702/138 |
| 7,205,916 B1 | 4/2007 | Stolan | |
| 7,248,994 B1 | 7/2007 | Stolan | |
| 9,068,861 B2 * | 6/2015 | O'Neil | ................. G01D 5/2291 |

* cited by examiner

SYSTEM AND METHOD FOR DETECTING POSITION OF DEVICE AND POSITION DETECTION MODULE

BACKGROUND

Embodiments of the disclosure relate generally to a position detection module, a system and a method for detecting a position of device.

Gas turbines, used in the generation of power, draw in air from the atmosphere and a fuel as inputs. The fuel can be gas, liquid or a combination of gas/liquid fuel. The fuel and air are combined and combusted to provide the driving force causing the turbine's rotor to rotate. As is known in the art, the power generated from the gas turbines can be controlled by controlling a rate at which the fuel and air are provided to the turbine.

Inlet air from the atmosphere passes through an inlet guide vane (IGV) and then enters a compressor. Inlet airflow rate can be adjusted by changing a vane angle of the IGV. Fuel flow is controlled by a set of flow control and pressure control valves. The flow control and pressure control valve position can be measured by two or more variable differential transformers (VDTs) per valve depending on configuration. In general, the linear variable differential transformer (LVDT) is used to measure a position of the valve. The LVDT provides a feedback signal in response to an external input excitation signal, the feedback signal is proportioned to the displacement of the valve. The position of the valve is calculated based on comparison of an instantaneous voltage value of the feedback signal and an instantaneous voltage value of the excitation signal.

However, sometimes, there are phase difference between the feedback signal and the excitation signal, therefore the calculated position of the valve may be inaccurate.

BRIEF DESCRIPTION

In accordance with one or more embodiments disclosed herein, a method for measuring a position of a device which is connected to a position sensor is provided. The method includes the steps of controlling an excitation unit to generate an excitation signal which excites the position sensor to provide a first feedback signal proportioned to the displacement of the device, controlling a sampling unit to sample the first feedback signal and obtain a plurality of first feedback samples, and calculating the position of the device based at least in part on the first feedback samples.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

In an effort to provide a concise description of these embodiments, not all features of an actual implementation are described in the one or more specific embodiments. It should be appreciated that in the development of any such actual implementation, as in any engineering or design project, numerous implementation-specific decisions must be made to achieve the developers' specific goals, such as compliance with system-related and business-related constraints, which may vary from one implementation to another.

Unless defined otherwise, technical and scientific terms used herein have the same meaning as is commonly understood by one of ordinary skill in the art to which this disclosure belongs. The terms "first," "second," and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean either any, several, or all of the listed items. The use of "including," "comprising," or "having" and variations thereof herein are meant to encompass the items listed thereafter and equivalents thereof as well as additional items. The terms "connected" and "coupled" are not restricted to physical or mechanical connections or couplings, and can include electrical connections or couplings, whether direct or indirect. The terms "circuit," "circuitry," and "controller" may include either a single component or a plurality of components, which are either active and/or passive components and may be optionally connected or otherwise coupled together to provide the described function.

Figure 1:
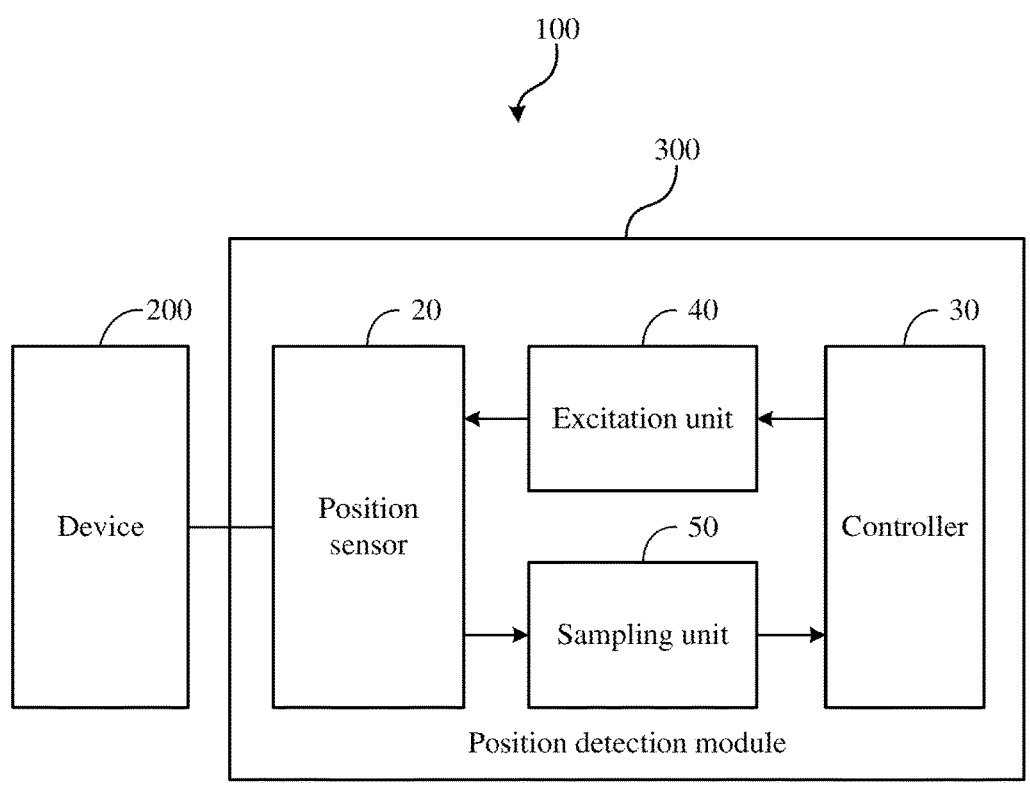
FIG. 1 is a block diagram of a system for measuring a position of the device in accordance with one embodiment of the present disclosure.

FIG. 1 is a block diagram of a system 100 in accordance with one embodiment of the present disclosure. The system 100 includes a device 200 and a position detection module 300. The position detection module 300 is configured for measuring a position of the device 200. In a first embodiment, the device 200 is a valve of a gas turbine. Correspondingly, the position detection module 300 is configured for measuring a position of the valve of the gas turbine. The valve controls a rate at which a gas flows in a pipe or other structure of the gas turbine.

In a second embodiment, the device 200 is a valve of the steam turbine. Correspondingly, the position detection module 300 is configured for measuring a position of the valve of the steam turbine. In other embodiments, the device 200 is a movable object, for example, a movable button.

The position detection module 300 includes a position sensor 20, a controller 30, an excitation unit 40, and a sampling unit 50. The position sensor 20 is mechanically coupled to the device 200. In a first embodiment, the position sensor 20 is a linear variable differential transformer (LVDT). In a second embodiment, the position sensor 20 is configured to provide different reluctance values based on position and shall be referred to herein as a linear variable differential reluctance (LVDR). In other embodiments, the position sensor 20 is a rotary variable differential transformer (RVDT), so as to meet different requirements.

In one embodiment, the controller 30 includes a micro control unit (MCU). In other embodiments, the controller 30 can include any suitable programmable circuits or devices, such as a field programmable gate array (FPGA), a digital signal processor (DSP), a programmable logic controller (PLC), and an application specific integrated circuit (ASIC), etc. The controller 30 can be implemented by hardware, software, or a combination of hardware and software.

In a first embodiment, the controller 30 is configured for performing following operations: (i) controlling the excitation unit 40 to generate an excitation signal which is configured for exciting the position sensor 20 to provide a feedback signal proportioned to the displacement of the device 200; (ii) controlling the sampling unit 50 to sample the feedback signal and obtain a plurality of feedback samples; (iii) calculating the position of the device 200 based at least in part on the feedback samples. The detailed calculation method will be described in FIG. 2 to FIG. 4.

In one embodiment, the excitation unit 40 is a digital to analog converter (DAC), the sampling unit 50 is an analog to digital converter (ADC). The reason of using the digital to analog converter as the excitation unit 40 is that the controller 30 can control the digital to analog converter to digitally regulate a frequency and an amplitude of the excitation signal. The digital regulation of the frequency and the amplitude of the excitation signal have a higher precision than conventional analog regulation of the frequency and the amplitude of the excitation signal.

In another embodiment, the excitation unit 40 is the digital to analog converter, the sampling unit 50 may be other sampling devices excepting the analog to digital converter. As an alternative embodiment, the excitation unit 40 may be other excitation devices excepting the digital to analog converter, the sampling unit 50 is an analog to digital converter (ADC).

In a second embodiment, compared to the aforementioned first embodiment, the controller 30 is further configured for performing the following operations: controlling the sampling unit 50 to sample the excitation signal and obtain a plurality of excitation samples. As described herein, the position of the device 200 is calculated based at least in part on comparison of the feedback samples and the excitation samples. The detailed calculation method will be described in FIG. 2 to FIG. 4.

As described in the prior art, the position of the device is calculated based on comparison of the instantaneous voltage value of the feedback signal and the instantaneous voltage value of the excitation signal. However, in the present disclosure, the position of the device 200 is calculated based at least in part on comparison of the plurality of feedback samples and the plurality of excitation samples. Because there are phase difference between the feedback signal and the excitation signal, the calculated position of the device 200 in the present disclosure have a higher accuracy than the calculated position of the device in the prior art.

In a third embodiment, compared to the aforementioned second embodiment, the position of the device 200 is calculated based at least in part on comparison of the excitation samples and the feedback samples obtained during a desired number of cycles of the excitation signal. The controller 30 is further configured for performing the following operations: (i) generating a plurality of positions based on calculating the position of the device 200 once every one or more cycles of the excitation signal; (ii) calculating an average value of the positions; (iii) calibrating the calculated position of the device 200 by the average value. It is obvious that the accuracy of the calculated position of the device 200 is further increased.

In a fourth embodiment, compared to the aforementioned second embodiment, the position of the device 200 is calculated based at least in part on comparison of the excitation samples and the feedback samples obtained during a desired number of cycles of the excitation signal. The controller 30 is further configured for performing the following operations: (i) generating a plurality of positions based on calculating the position of the device 200 once every one or more cycles of the excitation signal; (ii) calculating an average value of the positions excepting a maximum value and a minimum value of the positions; (iii) calibrating the calculated position of the device 200 by the average value.

Figure 2:
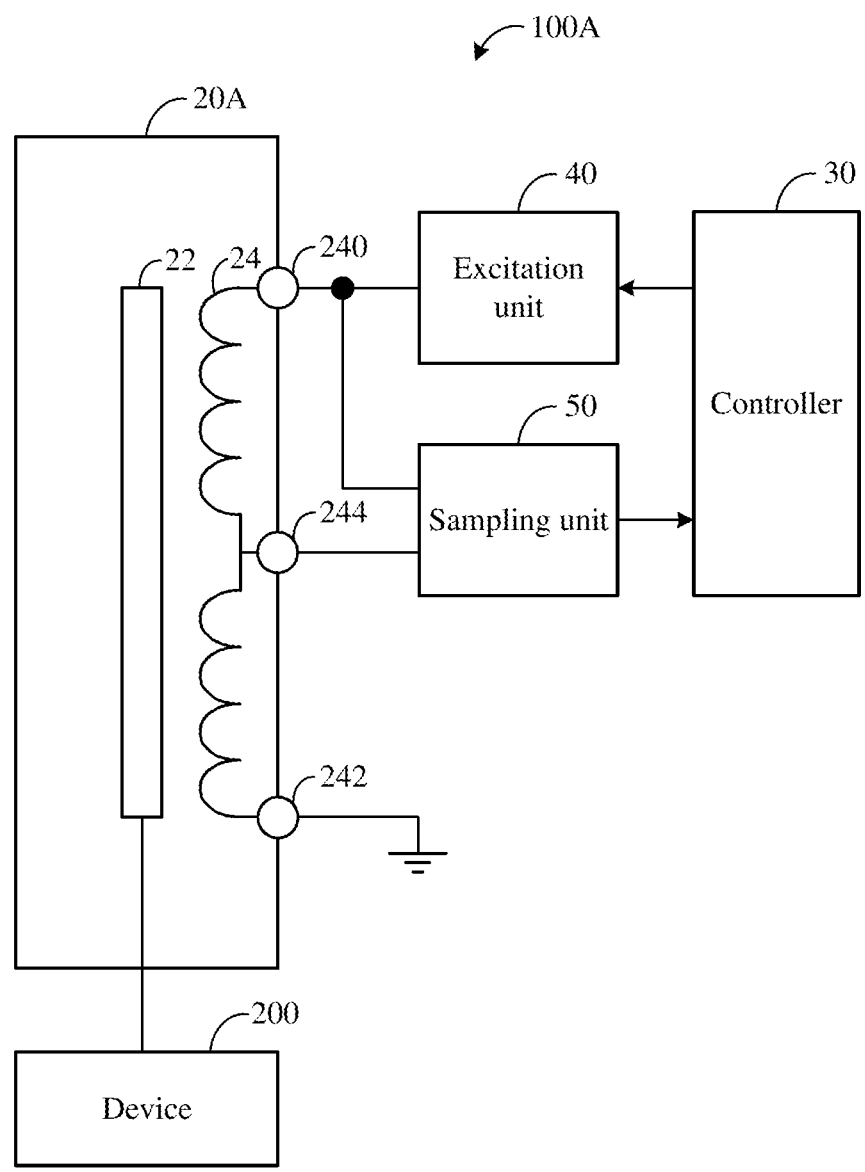
FIG. 2 is a circuit diagram of the system illustrated in FIG. 1 in accordance with a first embodiment of the present disclosure.

Referring to FIG. 2, a circuit diagram of the system 100A is shown in accordance with a first embodiment of the present disclosure. In the system 100A, the sampling unit 50 is coupled to the position sensor 20A and the excitation unit 40. The excitation unit 40 may be the digital to analog converter or other excitation devices, the sampling unit 50 may be the analog to digital converter or other sampling devices. In one embodiment, the excitation unit 40 is the digital to analog converter, the sampling unit 50 is the analog to digital converter.

The position sensor 20A is the LVDT referred to as a "three wires" configuration because there are three electrical contacts for the LVDT. The position sensor 20A includes a movable core 22 and a sensing coil 24. The movable core 22 couples the excitation signal to the sensing coil 24. The movable core 22 is mechanically coupled to the device 200. The sensing coil 24 includes a first electrical contact 240, a second electrical contact 242, and a third electrical contact 244 disposed between the first electrical contact 240 and the second electrical contact 242.

The first electrical contact 240 is electrically coupled to the excitation unit 40, and is configured for receiving an excitation signal from the excitation unit 40. The third electrical contact 244 is electrically coupled to the sampling unit 50. In one embodiment, the second electrical contact 242 is grounded. In the other embodiment, the second electrical contact 242 is connected to a reference potential.

The third electrical contact 244 is configured for providing the feedback signal to the sampling unit 50. Because the movable core 22 is mechanically coupled to the device 200, if the position of the device 200 is changed, the displacement of the movable core 22 is also changed. As the movable core 22 moves, the excitation signal's linkage to the sensing coil 24 changes, thus the feedback signal is changed. Therefore, the magnitude of the feedback signal is proportioned to the displacement of the device 200.

In the system 100A illustrated in FIG. 2, the sampling unit 50 samples the excitation signal and obtains a plurality of excitation samples, the sampling unit 50 further samples the feedback signal and obtains a plurality of feedback samples. The excitation signal and the feedback signal are sampled with the same sample rate.

In a first alternative embodiment, the controller 30 is configure to calculate two sums x and y, the sum x is the arithmetic sum of the absolute value of each of the excitation samples obtained during at least one cycle of the excitation signal; the sum y is the arithmetic sum of the absolute value of each of the feedback samples obtained during at least one cycle of the excitation signal. The position of the device 200 is calculated via the formula: $f=y/x$. Because the excitation signal is associated with the first electrical contact 240 of the sensing coil 24, the feedback signal is associated with the third electrical contact 244 of the sensing coil 24, there is no phase difference between the excitation signal and the feedback signal. Therefore, compared to the prior art, the accuracy of the calculated position of the device 200 is increased.

In a second alternative embodiment, the controller 30 is configure to calculate two sums x and y, the sum x is the arithmetic sum of each of the positive excitation samples obtained during at least one cycle of the excitation signal; the sum y is the arithmetic sum of each of the positive feedback samples obtained during at least one cycle of the excitation signal. The position of the device 200 is calculated via the formula: f=y/x. For similar reasons described above, the accuracy of calculated position of the device 200 is increased.

Figure 3:
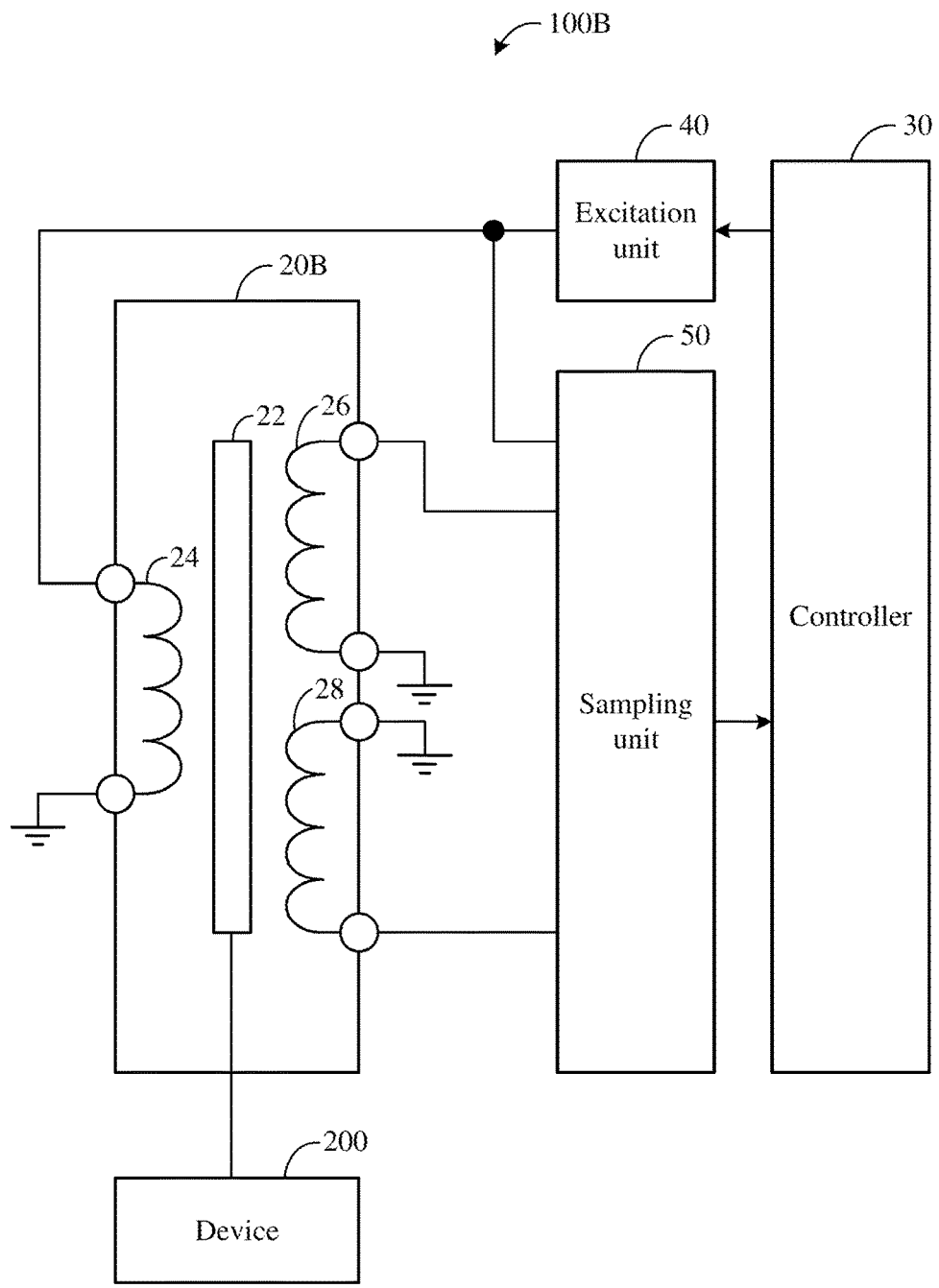
FIG. 3 is a circuit diagram of the system illustrated in FIG. 1 in accordance with a second embodiment of the present disclosure.

Referring to FIG. 3, a circuit diagram of the system 100B is shown in accordance with a second embodiment of the present disclosure. In the system 100B, the sampling unit 50 is coupled to the position sensor 20B and the excitation unit 40. The excitation unit 40 may be the digital to analog converter or other excitation devices, the sampling unit 50 may be the analog to digital converter or other sampling devices. In this embodiment, the excitation unit 40 is the digital to analog converter, the sampling unit 50 is the analog to digital converter.

The position sensor 20B is the LVDT referred to as a "six wires" configuration because three separate pairs of electric wires are connected to the LVDT. The position sensor 20B includes a movable core 22, an excitation winding 24, a first sensing coil 26, and a second sensing coil 28. The movable core 22 is mechanically coupled to the device 200.

A first end of the excitation winding 24 is electrically coupled to the excitation unit 40, and is configured for receiving an excitation signal from the excitation unit 40, a second end of the excitation winding 24 is grounded. In other embodiments, the second end of the excitation winding 24 is connected to a reference potential.

A first end of the first sensing coil 26 is configured for providing a first feedback signal to the sampling unit 50, a second end of the first sensing coil 26 is grounded or connected to a reference potential. A magnitude of the first feedback signal is proportioned to the displacement of the device 200.

A first end of the second sensing coil 28 is configured for providing a second feedback signal to the sampling unit 50, a second end of the second sensing coil 28 is grounded or connected to a reference potential. A magnitude of the second feedback signal is proportioned to the displacement of the device 200.

The movable core 22 magnetically couples the excitation winding 24 to the first sensing coil 26 and the second sensing coil 28. If the displacement of the device 200 is changed, the displacement of the movable core 22 is also changed. As the movable core 22 moves, the excitation signal's linkage to the first sensing coil 26 changes, the excitation signal's linkage to the second sensing coil 28 changes, thus the first feedback signal and the second feedback signal are changed. Therefore, a difference between the magnitude of the first feedback signal and the magnitude of the second feedback signal is proportioned to the displacement of the device 200.

In the system 100B illustrated in FIG. 3, the sampling unit 50 samples the excitation signal and obtains a plurality of excitation samples, the sampling unit 50 samples the first feedback signal and obtains a plurality of first feedback samples, the sampling unit 50 further samples the second feedback signal and obtains a plurality of second feedback samples. The excitation signal, the first feedback signal, and the second feedback signal are sampled with the same sample rate. In one embodiment, the first feedback signal and the second feedback signal of FIG. 3 are included in the feedback signal of FIG. 1, the first feedback samples and the second feedback samples of FIG. 3 are included in the feedback samples of FIG. 1.

In a first alternative embodiment, the controller 30 is configure to calculate three sums x, y, and z, the sum x is the arithmetic sum of the absolute value of each of the excitation samples obtained during at least one cycle of the excitation signal; the sum y is the arithmetic sum of the absolute value of each of the first feedback samples obtained during at least one cycle of the excitation signal, the sum z is the arithmetic sum of the absolute value of each of the second feedback samples obtained during at least one cycle of the excitation signal. The position of the device 200 is calculated via the formula: $f=(y-z)/x$. For the similar reason described above, accuracy of calculated position of the device 200 is increased.

In a second alternative embodiment, the controller 30 is configure to calculate three sums x, y, and z, the sum x is the arithmetic sum of each of the positive excitation samples obtained during at least one cycle of the excitation signal; the sum y is the arithmetic sum of each of the first positive feedback samples obtained during at least one cycle of the excitation signal, the sum z is the arithmetic sum of each of the second positive feedback samples obtained during at least one cycle of the excitation signal. The position of the device 200 is calculated via the formula: $f=(y-z)/x$. Accuracy of calculated position of the device 200 is increased based on similar reasons described above.

Figure 4:
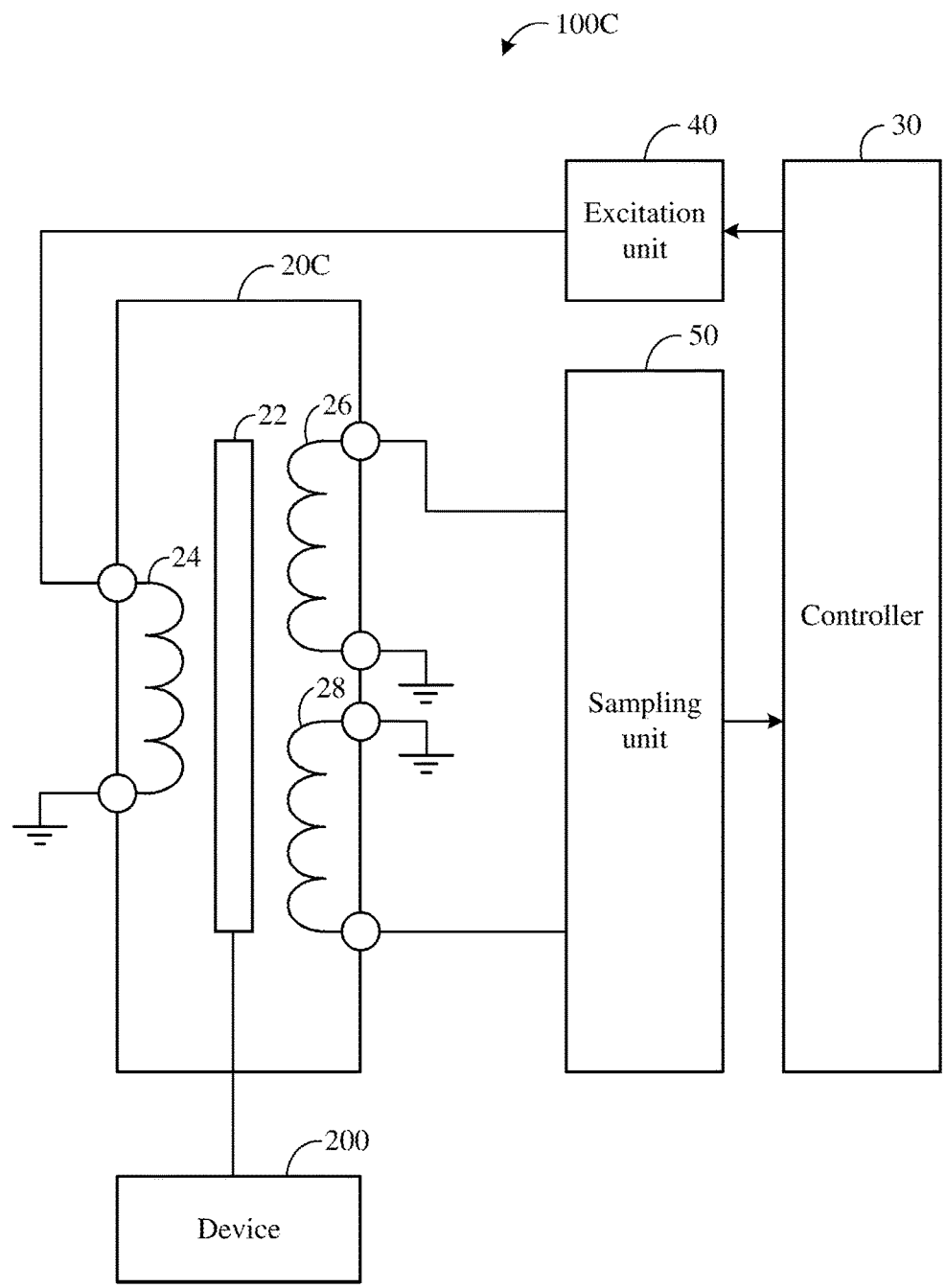
FIG. 4 is a circuit diagram of the system illustrated in FIG. 1 in accordance with a third embodiment of the present disclosure.

Referring to FIG. 4, a circuit diagram of the system 100C is shown in accordance with a third embodiment of the present disclosure. In the system 100C, the sampling unit 50 is coupled to the position sensor 20C. The sampling unit 50 samples the first feedback signal provided by the first sensing coil 26 and obtains a plurality of first feedback samples, the sampling unit 50 further samples the second feedback signal provided by the second sensing coil 28 and obtains a plurality of second feedback samples.

In a first alternative embodiment, the controller 30 is configure to calculate two sums x, and y, the sum x is the arithmetic sum of the absolute value of each of the first feedback samples obtained during at least one cycle of the excitation signal, the sum y is the arithmetic sum of the absolute value of each of the second feedback samples obtained during at least one cycle of the excitation signal. The position of the device 200 is calculated via the formula: $f=(x-y)/(x+y)$. The accuracy of calculated position of the device 200 is increased based on similar reasons described above.

In a second alternative embodiment, the controller 30 is configure to calculate two sums x, and y, the sum x is the arithmetic sum of each of the first positive feedback samples obtained during at least one cycle of the excitation signal, the sum y is the arithmetic sum of each of the second positive feedback samples obtained during at least one cycle of the excitation signal. The position of the device 200 is calculated via the formula: $f=(x-y)/(x+y)$. The accuracy of calculated position of the device 200 is increased based on similar reasons described above.

Figure 5:
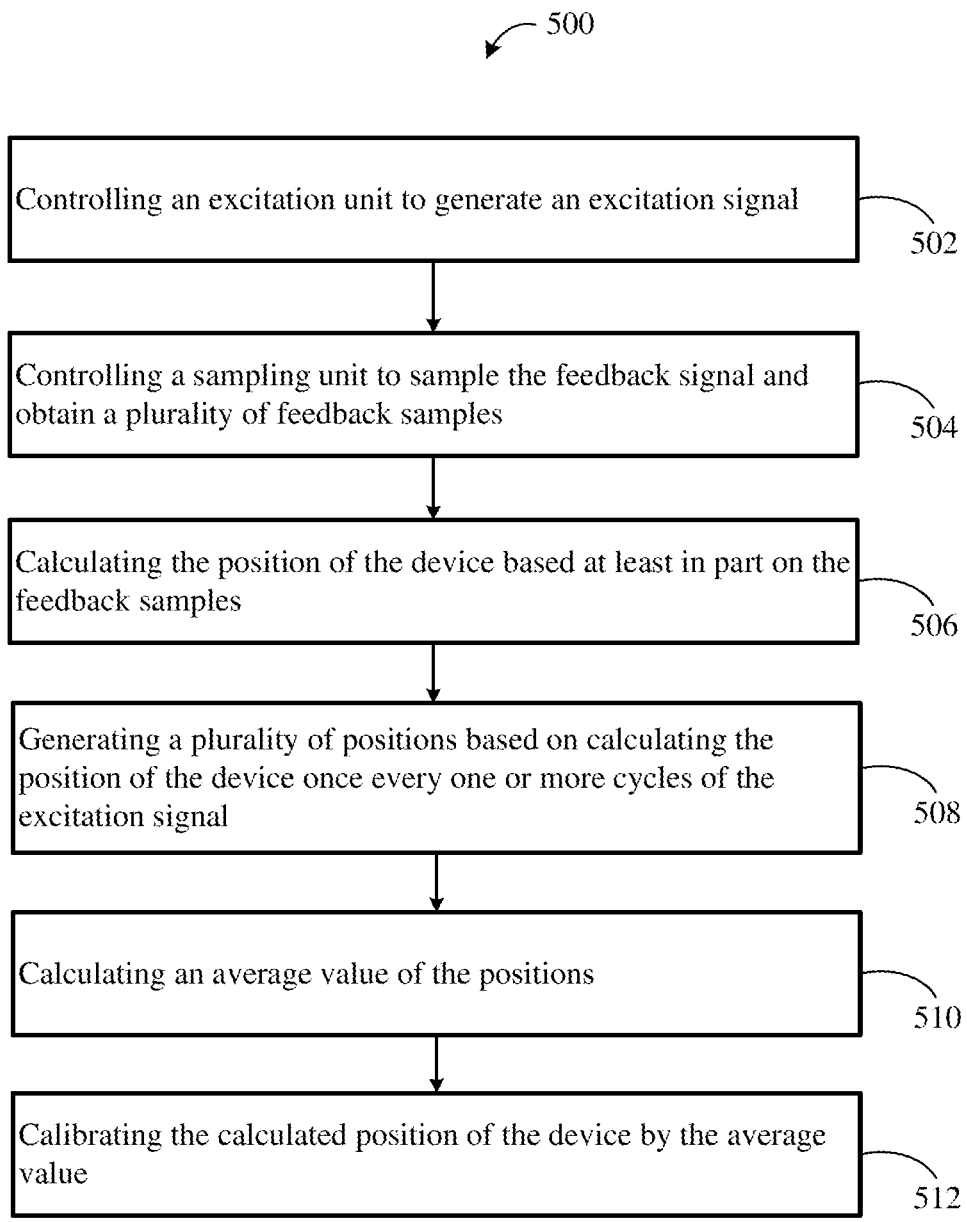
FIG. 5 is a flow chart illustrating a method for measuring a position of the device in accordance with one embodiment of the present disclosure.

Referring to FIG. 5, a method 500 is illustrated in accordance with one embodiment of the present disclosure. The method 500 is implemented in the system 100A of FIG. 2, the system 100B of FIG. 3, or the system 100C of FIG. 4. The method 500 includes following steps.

Step 502, the controller 30 controls the excitation unit 40 to generate an excitation signal which excites the position sensor 20 to provide a feedback signal proportioned to the displacement of the device 200. In the embodiment, the excitation unit 40 may be the digital to analog converter or other excitation devices. In one embodiment, the position sensor 20 is the LVDT referred to as a "three wires" configuration illustrated in FIG. 2. In the other embodiment, the position sensor 20 is the LVDT referred to as a "six wires" configuration illustrated in FIG. 3.

Step 504, the controller 30 controls the sampling unit 50 to sample the feedback signal and obtain a plurality of feedback samples. In the embodiment, the sampling unit 50 may be the analog to digital converter or other sampling devices.

Step 506, the controller 30 calculates the displacement of the device 200 based at least in part on the feedback samples.

In a first alternative embodiment, the method 500 further includes the steps of controlling the sampling unit 50 to sample the excitation signal and obtain a plurality of excitation samples. The displacement of the device 200 is calculated based at least in part on comparison of the excitation samples and the feedback samples. In other embodiments, the displacement of the device 200 is calculated based at least in part on comparison of the excitation samples and the feedback samples obtained during a desired number of cycles of the excitation signal.

In a second alternative embodiment, the method 500 further includes the following steps.

Step 508, the controller 30 generates a plurality of positions based on calculating the position of the device 200 once every one or more cycles of the excitation signal.

Step 510, the controller 30 calculates an average value of the positions or calculates an average value of the positions excepting a maximum value and a minimum value of the positions.

Step 512, the controller 30 calibrates the calculated position of the device 200 by the average value.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. A method for measuring a position of a valve comprising a position detection module, which comprises a position sensor, a controller, an excitation unit, and a sampling unit, the method comprising:
   controlling, using the controller of the position detection module, the excitation unit to generate an excitation signal which excites the position sensor to provide a first feedback signal proportioned to the displacement of the valve, the excitation unit including circuitry;
   controlling, using the controller of the position detection module, the sampling unit to sample the first feedback signal and obtain a plurality of first feedback samples during a pre-determined number of cycles of the excitation signal, the sampling unit including circuitry;
   controlling the sampling unit to sample the excitation signal and obtain a plurality of excitation samples during the pre-determined number of cycles of the excitation signal;
   and calculating, using the position detection module, the position of the valve based at least in part on the first feedback samples and at least in part on comparison of the excitation samples and the first feedback samples, the position of the valve calculated once every pre-determined number of cycles of the excitation signal to generate a plurality of positions;
   calculating an average value of the plurality of generated positions; and
   calibrating the calculated position of the valve based on the average value of the plurality of generated positions.

2. The method of claim 1, wherein the excitation unit is a digital to analog converter (DAC), and the sampling unit is an analog to digital converter (ADC).

3. The method of claim 1, wherein the excitation signal and the first feedback signal are sampled with the same sample rate, the excitation samples and the first feedback samples are obtained during at least one cycle of the excitation signal;
   wherein the method further comprises: calculating a first sum and a second sum, the first sum is the arithmetic sum of the absolute value of each of the excitation samples;
   the second sum is the arithmetic sum of the absolute value of each of the first feedback samples; and
   wherein the position of the valve is calculated via the formula: $f=SEC/PRI$, where f is the position, PRI is the first sum, SEC is the second sum.

4. The method of claim 1, wherein the excitation signal further excites the position sensor to provide a second feedback signal proportioned to the displacement of the valve;
   wherein the method further comprises: controlling the sampling unit to sample the second feedback signal and obtain a plurality of second feedback samples;
   wherein the excitation signal, the first feedback signal and the second feedback signal are sampled with the same sample rate;
   the excitation samples, the first feedback samples and the second feedback samples are obtained during at least one cycle of the excitation signal;
   and calculating a first sum, a second sum and a third sum;
   wherein the first sum is the arithmetic sum of the absolute value of each of the excitation samples, the second sum is the arithmetic sum of the absolute value of each of the first feedback samples, the third sum is the arithmetic sum of the absolute value of each of the second feedback samples; and
   wherein the position of the valve is calculated via the formula: $f=(SEC1-SEC2)/PRI$, where f is the position, PRI is the first sum, SEC1 is the second sum, SEC2 is the third sum.

5. The method of claim 1, wherein the excitation signal further excites the position sensor to provide a second feedback signal proportioned to the displacement of the valve; wherein the method further comprises:
   controlling the sampling unit to sample the second feedback signal and obtain a plurality of second feedback samples;
   wherein the first feedback signal and the second feedback signal are sampled with the same sample rate;

the first feedback samples and the second feedback samples are obtained during at least one cycle of the first feedback signal; and calculating a first sum and a second sum;

wherein the first sum is the arithmetic sum of the absolute value of each of the first feedback samples, the second sum is the arithmetic sum of the absolute value of each of the second feedback samples; and wherein the position of the valve is calculated via the formula: f=(SEC1−SEC2)/(SEC1+SEC2), where f is the position, SEC1 is the first sum, SEC2 is the second sum.

6. A system for measuring a position of a valve, wherein the system comprises a position detection module, which comprises a position sensor, a controller, an excitation unit, and a sampling unit, which is connected to a position sensor, the system comprising:

a controller configured for: controlling an excitation unit to generate an excitation signal which excites the position sensor to provide a first feedback signal proportioned to the displacement of the valve, the excitation unit including circuitry;

controlling a sampling unit to sample the first feedback signal and obtain a plurality of first feedback samples during a pre-determined number of cycles of the excitation signal, the sampling unit including circuitry; and controlling the sampling unit to sample the excitation signal and obtain a plurality of excitation samples during the pre-determined number of cycles of the excitation signal;

calculating, using the position detection module, the position of the valve based at least in part on the first feedback samples and at least in part on comparison of the excitation samples and the first feedback samples, the position of the valve calculated once every desired number of cycles of the excitation signal to generate a plurality of positions;

calculating an average value of the plurality of generated positions; and calibrating the calculated position of the valve based on the average value of the plurality of generated positions.

7. The system of claim 6, wherein the excitation unit is a digital to analog converter (DAC), and the sampling unit is an analog to digital converter (ADC).

8. The system of claim 6, wherein the excitation signal and the first feedback signal are sampled with the same sample rate, the excitation samples and the first feedback samples are obtained during at least one cycle of the excitation signal;

wherein the controller is further configured for: calculating a first sum and a second sum, the first sum is the arithmetic sum of the absolute value of each of the excitation samples;

the second sum is the arithmetic sum of the absolute value of each of the first feedback samples; and wherein the position of the valve is calculated via the formula: f=SEC/PRI, where f is the position, PRI is the first sum, SEC is the second sum.

9. The system of claim 6, wherein the excitation signal further excites the position sensor to provide a second feedback signal proportioned to the displacement of the valve;

wherein the controller is further configured for: controlling the sampling unit to sample the second feedback signal and obtain a plurality of second feedback samples;

wherein the excitation signal, the first feedback signal and the second feedback signal are sampled with the same sample rate;

the excitation samples, the first feedback samples and the second feedback samples are obtained during at least one cycle of the excitation signal; and calculating a first sum, a second sum and a third sum;

wherein the first sum is the arithmetic sum of the absolute value of each of the excitation samples, the second sum is the arithmetic sum of the absolute value of each of the first feedback samples, the third sum is the arithmetic sum of the absolute value of each of the second feedback samples; and wherein the position of the valve is calculated via the formula: f=(SEC1−SEC2)/PRI, where f is the position, PRI is the first sum, SEC1 is the second sum, SEC2 is the third sum.

10. The system of claim 6, wherein the excitation signal further excites the position sensor to provide a second feedback signal proportioned to the displacement of the valve;

wherein the controller is further configured for: controlling the sampling unit to sample the second feedback signal and obtain a plurality of second feedback samples;

wherein the first feedback signal and the second feedback signal are sampled with the same sample rate;

the first feedback samples and the second feedback samples are obtained during at least one cycle of the first feedback signal; and calculating a first sum and a second sum;

wherein the first sum is the arithmetic sum of the absolute value of each of the first feedback samples, the second sum is the arithmetic sum of the absolute value of each of the second feedback samples; and wherein the position of the valve is calculated via the formula: f=(SEC1−SEC2)/(SEC1+SEC2), where f is the position, SEC1 is the first sum, SEC2 is the second sum.

11. An apparatus, comprising: a position detection module, comprising:

a position sensor connected to a valve;

an excitation unit, the excitation unit including circuitry;

a sampling unit, the sampling unit including circuitry; and a controller configured for: controlling, using the controller of the position detection module, the excitation unit to generate an excitation signal which excites the position sensor to provide a first feedback signal proportioned to the displacement of the valve;

controlling, using the controller of the position detection module, the sampling unit to sample the first feedback signal and obtain a plurality of first feedback samples during a pre-determined number of cycles of the excitation signal;

controlling the sampling unit to sample the excitation signal and obtain a plurality of excitation samples during the pre-determined number of cycles of the excitation signal; and calculating, using the position detection module, a position of the valve based at least in part on the first feedback samples and at least in part on comparison of the excitation samples and the first feedback samples, the position of the valve calculated once every pre-determined number of cycles of the excitation signal to generate a plurality of positions;

calculating an average value of the plurality of generated positions; and calibrating the calculated position of the valve based on the average value of the plurality of generated positions.

12. The apparatus of claim 11, wherein the excitation unit is a digital to analog converter (DAC), and the sampling unit is an analog to digital converter (ADC).

13. The apparatus of claim 11, wherein the excitation signal and the first feedback signal are sampled with the same sample rate, the excitation samples and the first feedback samples are obtained during at least one cycle of the excitation signal;

wherein the controller is further configured for: calculating a first sum and a second sum, the first sum is the arithmetic sum of the absolute value of each of the excitation samples;

the second sum is the arithmetic sum of the absolute value of each of the first feedback samples; and wherein the position of the valve is calculated via the formula: f=SEC/PRI, where f is the position, PRI is the first sum, SEC is the second sum.

14. The apparatus of claim 11, wherein the excitation signal further excites the position sensor to provide a second feedback signal proportioned to the displacement of the valve;

wherein the controller is further configured for: controlling the sampling unit to sample the second feedback signal and obtain a plurality of second feedback samples;

wherein the excitation signal, the first feedback signal and the second feedback signal are sampled with the same sample rate;

the excitation samples, the first feedback samples and the second feedback samples are obtained during at least one cycle of the excitation signal; and calculating a first sum, a second sum and a third sum;

wherein the first sum is the arithmetic sum of the absolute value of each of the excitation samples, the second sum is the arithmetic sum of the absolute value of each of the first feedback samples, the third sum is the arithmetic sum of the absolute value of each of the second feedback samples; and wherein the position of the valve is calculated via the formula: f=(SEC1−SEC2)/PRI, where f is the position, PRI is the first sum, SEC1 is the second sum, SEC2 is the third sum.

* * * * *